United States Patent [19]

Houston

[11] 3,998,470
[45] Dec. 21, 1976

[54] AUXILIARY MEANS FOR USE WITH A KICKSTAND

[76] Inventor: Thomas J. Houston, 52 Rockwell Road, Jackson, Tenn. 38301

[22] Filed: May 6, 1975

[21] Appl. No.: 574,904

[52] U.S. Cl. ............................. 280/301; 280/763
[51] Int. Cl.² ..................................... B62H 1/02
[58] Field of Search ......... 280/293, 294, 295, 296, 280/297, 298, 299, 300, 301, 302, 303, 304, 763, 764, 765, 766

[56] References Cited

UNITED STATES PATENTS

| 515,800 | 3/1894 | Smith | 280/301 |
|---|---|---|---|
| 585,616 | 6/1897 | Bowles | 280/301 |
| 617,028 | 1/1899 | Koehler | 280/294 |
| 1,338,029 | 4/1920 | Lydecker | 280/299 |
| 2,225,157 | 12/1940 | Court | 280/150.5 |
| 2,835,508 | 5/1958 | Wood et al. | 280/301 |
| 3,315,973 | 4/1967 | Marple | 280/150.5 X |
| 3,712,640 | 1/1973 | Shipman | 280/301 |
| 3,767,226 | 10/1973 | Stephens | 280/150.5 |

FOREIGN PATENTS OR APPLICATIONS

| 290,769 | 11/1931 | Italy | 280/293 |
|---|---|---|---|
| 557,627 | 2/1957 | Italy | 280/303 |
| 134,796 | 11/1919 | United Kingdom | 280/299 |

Primary Examiner—Joseph F. Peters
Assistant Examiner—John P. Silverstrim
Attorney, Agent, or Firm—John R. Walker, III

[57] ABSTRACT

A device for use with a kickstand of a two-wheeled vehicle to substantially increase the load bearing area of the kickstand. A platelike member is pivotally mounted to the kickstand and is urged by a spring to a first position substantially aligned with the kickstand to prevent it from interfering with the operation of the vehicle when the kickstand is in a stored position and wherein the supporting surface of the vehicle will cause it to pivot about the kickstand from the first position to a second position substantially aligned with the supporting surface of the vehicle when the kickstand is moved from the stored position to an in-use position.

6 Claims, 5 Drawing Figures

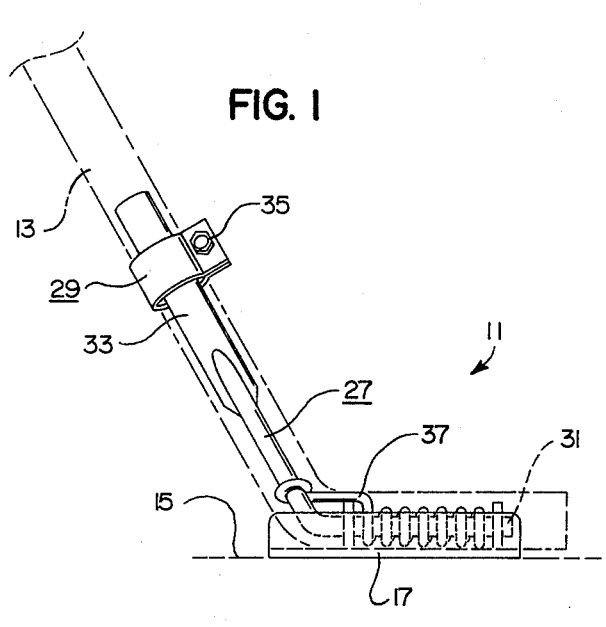
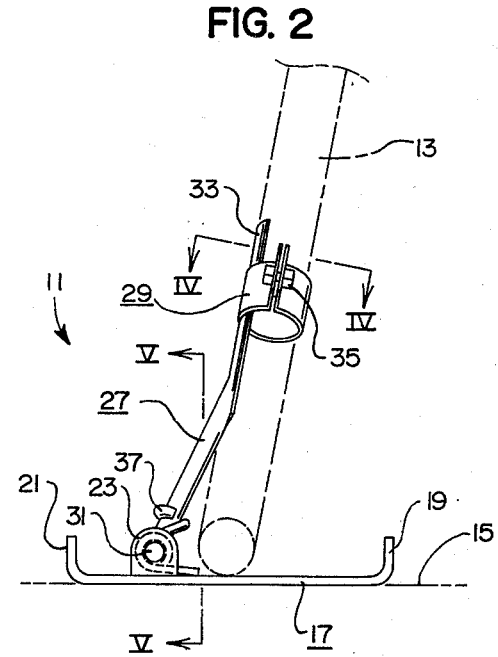
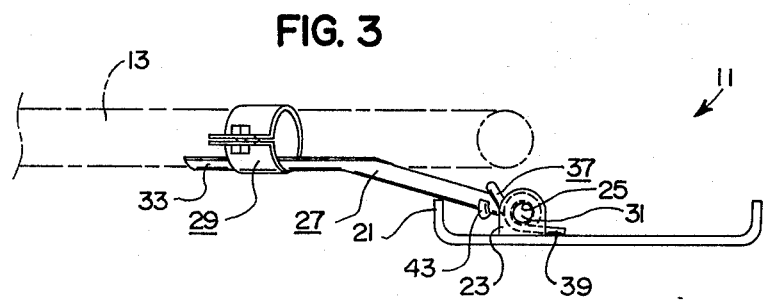
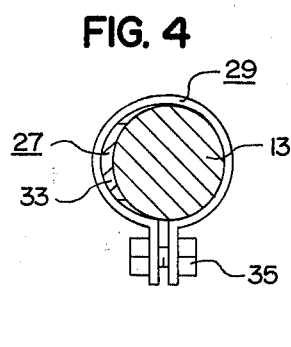
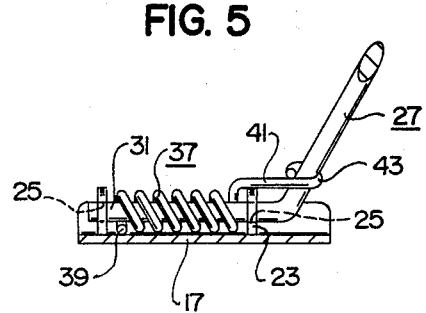

AUXILIARY MEANS FOR USE WITH A KICKSTAND

BACKGROUND OF THE INVENTION

1. Field of the Invention

This invention relates generally to means for supporting two-wheeled vehicles and more specifically to auxiliary means for use with the kickstand of such two-wheeled vehicles to aid in the supporting thereof.

2. Description of the Prior Art

Heretofore, various means for supporting two-wheeled vehicles have been developed. See, for example, Woodward (U.S. Pat. No. 523,952), Otto (U.S. Pat. No. 571,979), Hawkes (U.S. Pat. No. 602,134), Settle (U.S. Pat. No. 948,349), Pawsat (U.S. Pat. No. 2,074,422), Thompson (U.S. Pat. No. 2,308,794), Wood et al (U.S. Pat. No. 2,835,508), and Shipman et al (U.S. Pat. No. 3,712,640). None of the above patents disclose or suggest the present invention.

The known prior means for supporting two-wheeled vehicles perform substantially satisfactorily when the two-wheeled vehicle is a relatively lightweight bicycle or the like. However, when the two-wheeled vehicle is a relatively heavy motorcycle or the like, all the known prior means for support thereof have not performed satisfactorily. More specifically, heavy motorcycles require something more than standard kickstands when they are supported on anything but an absolutely non-yielding supporting surface such as concrete. When such heavy motorcycles are supported on a yielding supporting surface such as dirt, sand, asphalt or the like by use of a standard kickstand, oftentime the kickstand will sink into the supporting surface which may result in the motorcycle falling over, possibly damaging the motorcycle and/or injuring bystanders. Shipman et al discloses one method of overcoming this problem. In this method, a support plate is attached to the outer end of the kickstand to distribute the weight of the motorcycle being supported by the kickstand over a larger area of the supporting surface. However, a major disadvantage with such a method is that if the support plate is of an adequate size to safely support a motorcycle on a yielding supporting surface, it usually interferes with the operation of the motorcycle when the kickstand is in a stored position. Wood et al discloses a shoe for a bicycle kickstand which is pivotally mounted to the kickstand to allow the shoe to be aligned with the kickstand when the kickstand is in a stored position. However, such a shoe would not perform satisfactorily on a heavy motorcycle since it requires the end of the kickstand to be drilled out for allowing a pivot to pass therethrough which would unduly weaken the kickstand and result in possible failure of the kickstand when a heavy motorcycle is supported thereby and since it requires a manual effort to be pivoted back and forth which would result in the possibility of physical injury to the user when trying to manually pivot the shoe back and forth while holding a heavy motorcycle and while moving the kickstand between stored and in-use positions.

SUMMARY OF THE INVENTION

The present invention is directed towards overcoming the problems and disadvantages of prior means for supporting two-wheeled vehicles. The concept of the present invention is to provide an auxiliary means for use with the kickstand of a two-wheeled vehicle to aid in the support thereof. The auxiliary means includes a platelike means for pivotally mounting to the kickstand and for contacting the supporting surface of the vehicle when the kickstand is in an in-use position to substantially increase the load bearing area of the kickstand and includes spring means for urging the plate-like means to a first position substantially aligned with the kickstand to prevent the platelike means from interfering with the operation of the vehicle when the kickstand is in a stored position and wherein the supporting surface of the vehicle will cause the platelike means to pivot about the kickstand from the first position to a second position substantially aligned with the supporting surface of the vehicle when the kickstand is moved from the stored position to the in-use position. Preferably, the auxiliary means includes a pivot member having a first end for pivotal attachment to the platelike means and having a second end for fixed attachment to the kickstand and includes a clamp member for extending around the second end of the pivot member and the kickstand to fixedly clamp the pivot member to the kickstand.

BRIEF DESCRIPTION OF THE DRAWINGS

FIG. 1 is a front elevational view of the auxiliary means of the present invention shown in an in-use position with a kickstand of a two-wheeled vehicle shown in phantom lines.

FIG. 2 is a side elevational view of the auxiliary means of the present invention shown in an in-use position with the kickstand of a two-wheeled vehicle shown in phantom lines.

FIG. 3 is a side elevational view of the auxiliary means of the present invention shown in a stored position with the kickstand of a two-wheeled vehicle shown in phantom lines.

FIG. 4 is a sectional view of a portion of the auxiliary means of the present invention as taken on line IV—IV of FIG. 2 with the kickstand of a two-wheeled vehicle shown in solid lines.

FIG. 5 is a sectional view of a portion of the auxiliary means of the present invention as taken on line V—V of FIG. 2.

DESCRIPTION OF THE PREFERRED EMBODIMENT

The auxiliary means 11 of the present invention is for use with a kickstand 13 of a two-wheeled vehicle such as a motorcycle or the like. The auxiliary means 11 is used to substantially increase the load bearing area of the kickstand 13 to transfer the weight of the vehicle being supported by the kickstand 13 over a substantially large area of the supporting surface 15 of the vehicle to safely and securely support the vehicle when the supporting surface 15 is of a yielding material such as dirt, sand, asphalt or the like.

The auxiliary means 11 includes a platelike means or member 17 adapted to be pivotally mounted to the kickstand 13. The platelike member 17 preferably includes a first end 19 and a second end 21. The first and second ends 19, 21 are preferably turned up in a smooth curve for reasons which will become apparent hereinafter. The platelike member 17 also preferably includes a pair of spaced apart lugs 23 having apertures 25 therein for reasons which will become apparent hereinafter.

The auxiliary means 11 also includes an attachment means for attaching the platelike member 17 to the kickstand 13. The attachment means includes a pivot member 27 and a clamp member 29. The pivot member 27 includes a first end 31 for pivotal attachment to the platelike member 17 and a second end 33 for fixed attachment to the kickstand 13. The first end 31 of the pivot member 27 is adapted to be inserted through the apertures 25 in the pair of lugs 23 of the platelike member 17 thereby pivotally attaching the pivot member 27 and platelike member 17 together. The clamp member 29 is adapted to extend around the second end 33 of the pivot member and the kickstand 13 to fixedly clamp the pivot member 27 to the kickstand 13. The clamp member 29 may include a bolt member 35 or the like to aid in fixedly clamping the second end 33 of the pivot member 29 to the kickstand 13. The second end 33 of the pivot member 27 is preferably shaped to substantially correspond with the shape of a portion of the kickstand 13 for allowing a better connection therebetween. For example, when the kickstand 13 has a circular cross-sectional shape, the second end 33 of the pivot member 27 preferably has an arcuate cross-sectional shape (see FIG. 4).

The auxiliary means 11 includes a spring means or member 37 for urging the platelike member 17 to a first position substantially aligned with the kickstand 13 (see FIG. 3) to prevent the platelike member 17 from interfering with the operation of the vehicle when the kickstand 13 is in a stored position and wherein the supporting surface 15 of the vehicle will cause the platelike member 17 to pivot about the kickstand 13 from the first position to a second position substantially aligned with the supporting surface 15 of the vehicle (see FIGS. 1 and 2) when the kickstand 13 is moved from the stored position to the in-use position. The spring member 37 is preferably placed around the first end 37 of the pivot member 27 intermediate the pair of lugs 23 of the platelike member 17 (see FIG. 5). The spring member 37 preferably includes a first end 39 for acting against the platelike member 17 and a second end 41 for attachment to the pivot member 27 by means of a loop 43 or the like.

To use the auxiliary means 11 of the present invention, the second end 33 of the pivot member 27 is fixedly attached to the kickstand 13 by the clamp member 29 in a position as shown by FIGS. 1, 2 and 3 of the drawings. When the kickstand 13 is in the stored position, the spring member 37 will urge the platelike member 17 to the first position substantially aligned with the kickstand 13 as shown by FIG. 3 of the drawings. As the kickstand 13 is moved from the stored position to the in-use position, the first end 19 of the platelike member 17 will strike the supporting surface 15 causing the platelike member 17 to pivot about the first end 33 of the pivot member 27 and the kickstand 13 so that when the kickstand 13 is placed fully within the in-use position, the platelike member 17 will be in the second position substantially aligned with the supporting surface 15. The first end 19 of the platelike member 17 is turned up to prevent the platelike member 17 from digging into the supporting surface 15 when the kickstand 13 is moved from the stored position to the in-use position. When the kickstand 13 is subsequently moved from the in-use position to the stored position, the spring member 37 will urge the platelike member 17 back to the first position substantially aligned with the kickstand 13. It should be noted that if the vehicle is inadvertently moved forward without moving the kickstand 13 from the in-use position to the stored position, the turned up second end 21 of the plate-like member 17 will act as a slide to prevent the platelike member 17 from digging into the supporting surface 15.

As thus constructed and used, the present invention provides an auxiliary means for use with the kickstand of a two-wheeled vehicle which will aid in the supporting of the two-wheeled vehicle on a yielding supporting surface even when the two-wheeled vehicle is a heavy motorcycle or the like, which does not weaken the kickstand and which does not require any manual effort to activate or deactivate.

Although the invention has been described and illustrated with respect to a preferred embodiment thereof, it is not to be so limited since changes and modifications may be made therein which are within the full intended scope of the invention.

I claim:

1. Auxiliary means for use with a kickstand of a two-wheeled vehicle to substantially increase the load bearing area of the kickstand, said auxiliary means comprising:
   a. plate means for contacting the supporting surface of the vehicle when the kickstand is in an in-use position to substantially increase the load bearing area of the kickstand;
   b. attachment means for pivotally mounting said plate means to the kickstand, said attachment means comprising a pivot member having a first end for pivotal attachment to said plate means and having a second end, and means for removably clamping said second end of said pivot member to the kickstand; and
   c. spring means disposed between said attachment means and said plate means for urging said plate means to a first position substantially aligned with the kickstand to prevent said plate means from interfering with the operation of the vehicle when the kickstand is in a stored position and wherein the supporting surface of the vehicle will cause said plate means to pivot about the kickstand from the first position to a second position substantially beneath the ground engaging portion of the kickstand and substantially aligned with the supporting surface of the vehicle when the kickstand is moved from the stored position to the in-use position.

2. The auxiliary means of claim 1 in which said second end of said pivot member is shaped to substantially correspond with the shape of a portion of the kickstand for allowing a better connection therebetween.

3. The auxiliary means of claim 2 in which said plate means includes a turned up first end for preventing said platelike means from digging into the supporting surface of the vehicle when the kickstand is moved from the stored position to the in-use position.

4. The auxiliary means of claim 3 in which said plate means includes a turned-up second end for preventing said plate means from digging into the supporting surface of the vehicle if the vehicle is inadvertently moved forward while the kickstand is in the in-use position.

5. In a two-wheeled vehicle having a kickstand for supporting the vehicle, the combination with the kickstand of auxiliary means for increasing the load bearing area of the kickstand, said auxiliary means comprising:
   a. plate means pivotally mounted to the kickstand for contacting the supporting surface of the vehicle when the kickstand is in an in-use position to substantially increase the load bearing area of the kickstand;

b. attachment means for pivotally mounting said plate means to the kickstand, said attachment means comprising a pivot member having a first end for pivotal attachment to said plate means and having a second end, and means extending around said second end of said pivot member and the kickstand for removably clamping said pivot member to the kickstand; and c. spring means disposed between said attachment means and said plate means for urging said plate means to a first position substantially aligned with the kickstand to prevent said plate means from interfering with the operation of the vehicle when the kickstand is in a stored position and wherein the supporting surface of the vehicle will cause said plate means to pivot about the kickstand from the first position to a second position substantially beneath the ground engaging portion of the kickstand and substantially aligned with the supporting surface of the vehicle when the kickstand is moved from the stored position to the in-use position.

6. The combination of claim 5 in which said plate means of said auxiliary means includes turned up first and second ends for preventing said plate means from digging into the supporting surface of the vehicle.

* * * * *